Figure 1A:
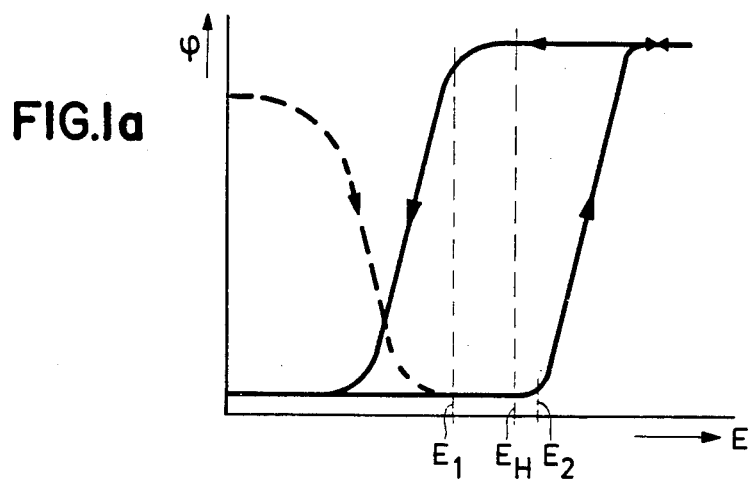

United States Patent [19]

van den Berk

[11] Patent Number: 4,536,059

[45] Date of Patent: Aug. 20, 1985

[54] LIQUID CRYSTAL DISPLAY DEVICE WITH RIDGES

[75] Inventor: Theodorus H. M. van den Berk, Eindhoven, Netherlands

[73] Assignee: U.S. Philips Corporation, New York, N.Y.

[21] Appl. No.: 453,423

[22] Filed: Dec. 27, 1982

[30] Foreign Application Priority Data

Jan. 11, 1982 [NL] Netherlands ............... 8200069

[51] Int. Cl.³ .............................................. G02F 1/13
[52] U.S. Cl. ................................. 350/333; 350/344; 350/346
[58] Field of Search ........... 350/346, 349, 344, 334, 350/336, 333

[56] References Cited

U.S. PATENT DOCUMENTS

| | | | |
|---|---|---|---|
| 3,787,110 | 1/1974 | Berreman et al. | 350/341 |
| 3,833,287 | 9/1974 | Taylor et al. | 350/349 |
| 3,861,783 | 1/1975 | Dill et al. | 350/344 X |
| 3,902,789 | 9/1975 | Gerritsma et al. | 350/344 |
| 4,264,149 | 4/1981 | Zwart et al. | 350/346 |
| 4,277,144 | 7/1981 | Saurer et al. | 350/340 X |

Primary Examiner—John K. Corbin
Assistant Examiner—David Lewis
Attorney, Agent, or Firm—Paul R. Miller

[57] ABSTRACT

In a matrix display device using the bistability effect of cholesteric liquid crystals, two supporting plates are provided with first and second pluralities of ridges. The electrodes of the liquid crystal extend across the second ridges onto the first ridges on which a separation strip separates the electrodes from one another. Liquid crystal orienting layers are provided over the entire surface of the supporting plate. The second ridges lying between the first ridges divide each picture element of the display into many sub-elements. Accordingly, the formation of focal-conical texture because of surface inhomogenities in the picture element display will be restricted to a single sub-element as a result of the homeotropic-nematic texture at the edges of the sub-element.

16 Claims, 6 Drawing Figures

LIQUID CRYSTAL DISPLAY DEVICE WITH RIDGES

The invention relates to a display device comprising two supporting plates, a plurality of picture elements which are formed by crossing patterns of strip-shaped electrodes on the facing surfaces of the supporting plates, orienting layers on the electrodes and the exposed surface of the supporting plates, a layer of cholesteric liquid crystal between the supporting plates, with the liquid crystal, upon applying an electric field across the layer, having a focal-conic texture below a given field strength $E_1$ and having a homeotropic-nematic texture above a given field strength $E_2$, and having one of these textures for a field strength between $E_1$ and $E_2$, with the device furthermore comprising first means to maintain the liquid crystal in the homeotropic-nematic texture at the edges of each picture element above a field strength $E_2$ if a field strength between $E_1$ and $E_2$ prevails in the central part of the picture element.

A cholesteric liquid crystal is to be understood to mean herein a nematic liquid crystal to which a certain quantity of cholesteric liquid crystal has been added and which mixture has a cholesteric texture.

Such a display device is known from U.S. Pat. No. 4,264,149 and may be used for displaying alphanumeric or picture information. In this known device the bistability effect is used which cholesteric liquid crystals exhibit. In this effect there is a substantially transparent cholesteric texture in which the axes of the helices are at right angles to the surfaces of the supporting plates. Above a given threshold value $E_{th}$ of the field strength, the substantially transparent cholesteric texture changes into a light-scattering focal-conic texture in which the axes of the helices extend parallel to the surfaces of the supporting plates. When the field strength increases the helices uncoil and the light-scattering focal-conic texture changes into a transparent homeotropic-nematic texture above a field strength $E_2$. As a result of the hysteresis in the transmission versus field strength characteristic the transparent homeotropic-nematic texture changes back into the light-scattering focal-conic texture only at a field strength $E_1$ smaller than the field strength $E_2$. This focal-conic texture is maintained for a longer period of time in the field-free state.

As a result of the hysteresis, the liquid crystal layer, at a field strength between $E_1$ and $E_2$, may be either in the transparent homeotropic-nematic texture or in the light-scattering focal-conic texture depending on whether the field strength started from a value higher than $E_2$ or a value lower than $E_1$.

In the matrix display device described in the aforementioned Patent, the said bistability effect is used as follows. The electrodes are provided on the supporting plates in the form of parallel strips. The electrodes on one supporting plate cross the electrodes on the other supporting plate. The electrodes on one supporting plate constitute the so-called rows and the electrodes on the other supporting plate constitute the so-called columns of the matrix. The picture elements are present at the crossings of the row and column electrodes. All picture elements of the matrix are brought into the transparent homeotropic-nematic texture by a sufficiently high voltage at the electrodes which results in a field strength above $E_2$ across the liquid crystal layer. A voltage which results in a field strength $E_H$ between $E_1$ and $E_2$ is then applied across all elements. The liquid crystal layer now has the property of remaining in the transparent homeotropic-nematic state for some time. The rows are successively driven and the information is written on the columns per row. For the elements which have to change into the scattering state the voltage is made zero until the homeotropic-nematic texture changes into the focal-conic texture. The remaining elements of a row during writing are kept at a voltage which results in a field strength larger than or equal to $E_H$ and consequently remain in the transparent homeotropic-nematic texture. A voltage which results in a field strength $E_H$ across the liquid crystal layer is then applied again across all elements of a row.

During the time in which a transparent homeotropic-nematic state of a line remains stable, other lines can be driven. The stability of the transparent homeotropic-nematic texture at a field strength $E_H$, however, is restricted in that the surroundings of a picture element are in the focal-conic state. The focal-conic texture as a matter of fact has the property of growing into parts of the liquid crystal which have the homeotropic-nematic texture, which results in disturbing light-scattering effects. In order to prevent the growth of the focal-conic texture into the homeotropic-nematic texture, the edges of each picture element are maintained above a field strength $E_2$ if a field strength between $E_1$ and $E_2$ prevails in the central part of the picture element. In the known device this is realized in that ridges separated by grooves are provided on the facing surfaces of the supporting plates. The grooves in one supporting plate are oriented at right angles to the grooves in the other supporting plate. The strip-shaped electrodes are provided in the grooves and extend onto the ridges and on the ridges are separated from each other by a narrow strip.

It has been found, however, that the homeotropic-nematic texture at a field strength between $E_1$ and $E_2$ can be disturbed not only by the focal-conic texture growing-in from the surroundings of a picture element, but also by the focal-conic texture starting to grow from within a picture element. This is caused by unevennesses and damage to the electrodes and by dust particles which form growth nuclei for the formation of the focal-conic texture. It is to be noted that this phenomenon is known per se from the article "Nucleation of Focal-Conic Domains in the Field-Induced Nematic Texture of a Cholesteric Liquid Crystal", Japanese Journal of Applied Physics, Vol 17, No. 2, February 1978, pp. 391–394.

It is therefore the object of the invention to provide a display device with which disturbing effects caused by the formation of the focal-conic texture within a picture element are prevented as much as possible. For that purpose, a display device of a kind mentioned in the opening paragraph is characterized according to the invention in that the device comprises second means which divide each picture element into a number of sub-elements and which maintain the edges of each sub-element in the homeotropic-nematic texture above a field strength $E_2$ if a field strength between $E_1$ and $E_2$ prevails at the area of the picture element. By dividing each picture element into many smaller sub-elements surrounded by an edge where a field strength prevails larger than $E_2$, the growth of the focal-conic texture resulting from surface-inhomogeneities is restricted to one or a few sub-elements. The focal-conic texture, as a result of this, cannot expand over the entire picture element and thus remains substantially unnoticeable.

A first embodiment of a display device in accordance with the invention is characterized in that the first means are formed by first ridges present on the supporting plate and separated by grooves and the height of which is substantially equal to half the thickness of the layer of liquid crystal, in that the second means are formed by a number of second ridges formed in each groove, and in that electrodes are provided in the grooves and extend over the second ridges onto the first ridges and which are separated from each other by a strip on the first ridges. The picture elements are each divided into many sub-elements by the second ridges. If the liquid crystal in a sub-element at a field-strength between $E_1$ and $E_2$ is in the homeotropic-nematic or in the focal-conic state, then such a high field strength prevails at the area of the second ridges that the liquid crystal at this area of the second ridges of the edges of the sub-element is in the stable homeotropic-nematic state above a field strength $E_2$.

A second embodiment is characterized in that the height of the second ridges is substantially equal to the height of the first ridges. The second ridges as well as the first ridges serve as spacing elements for the supporting plates.

In the first and second embodiments the liquid crystal orienting layer provided over the electrodes and the exposed surface of supporting plates may be electrically insulating so as to prevent short-circuit between the electrodes of the supporting plates. Instead of an insulating orienting layer the orienting layer may alternatively be provided on an electically insulating intermediate layer. This intermediate layer may also serve to improve the adhesion of the orienting materials.

A third embodiment of a display device in accordance with the invention is characterized in that a boss is present at the area of the strip between two electrodes on the first ridges. The supporting plates engage each other with the bosses. As a result of this the orienting layer need no longer be electrically insulating.

Figures 1B, 1C, 1D:
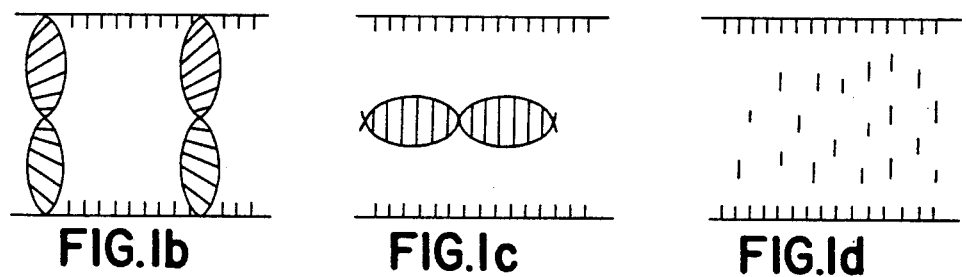
Figure 3:
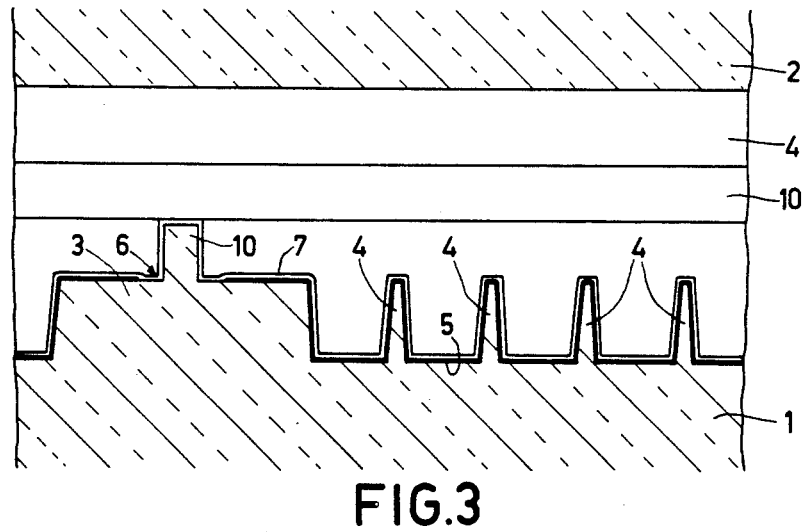
Figure 2:
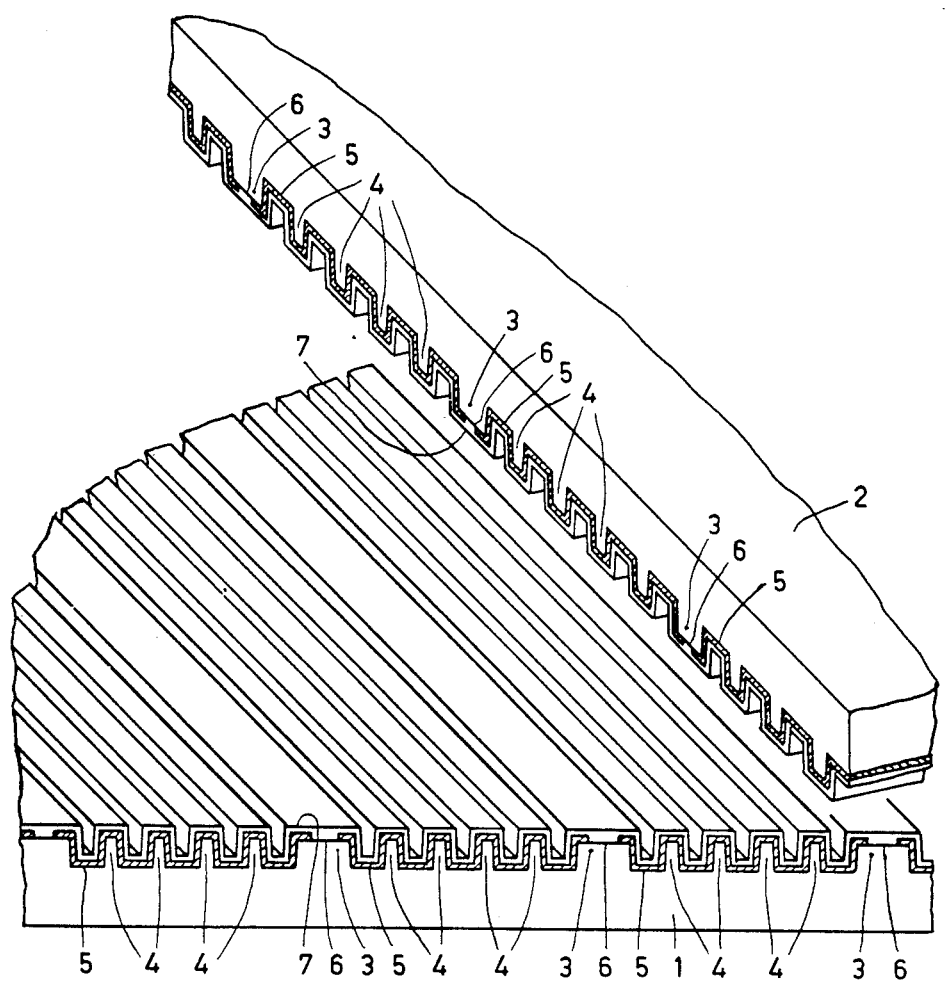

The invention will now be described in greater detail with reference to the accompanying drawing, of which:

FIG. 1 illustrates the operating principle of a display device embodying the invention, FIG. 2 shows a first embodiment of a display device partly broken away, and FIG. 3 is a cross-sectional view of a part of the device according to a second embodiment.

FIG. 1a shows a field strength versus transmission characteristic of a display device using the bistability effect of a cholesteric liquid crystal. The longitudinal axes of the liquid crystal molecules at the interface with the electrodes are oriented at right angles to the electrode surface. For that purpose the electrode surface has been subjected in known manner to a surface treatment. Initially the liquid crystal has a transparent planar-conic texture in which the axes of the helices are at right angles to the surface of the supporting plates as is shown diagrammatically in FIG. 1b. The pitch of the helices depends on the composition of the nematic-cholesteric liquid crystal mixture and on the cholesteric liquid crystal used. Upon applying a voltage across the electrodes the transparent planar-conic texture changes into a light-scattering focal-conic texture, as is shown in FIG. 1c, at a field strength dependent on the liquid crystal used. The axes of the helices rotate into a direction parallel to the plates. When the field strength increases above a given value $E_2$ the helices uncoil and a transparent homeotropic-nematic texture is formed as is shown in FIG. 1d. When the field strength decreases the transparent homeotropic-nematic texture is maintained until a field strength $E_1 < E_2$ is reached, below which field strength the light-scattering focal-conic texture is again formed. The focal-conic texture is maintained when the field strength across the electrodes decreases. In the field-free state the focal-conic texture changes only slowly into the planar-conic texture. The times required for this purpose, however, are large as compared with the switching times which are usual in a matrix control so that the planar-conic texture does not occur in an operating matrix display device. At a field strength $E_1 < E_H < E_2$ the liquid crystal layer is in a transparent homeotropic-nematic state when the field strength is initially higher than $E_2$ or is in a light-scattering focal-conic state when the field strength is initially lower than $E_1$.

The above-mentioned effects also occur in the case in which the liquid crystal molecules are not oriented at right angles to but parallel to the electrodes. The transparent cholesteric texture in which the axes of the helices are at right angles to the surfaces of the supporting plates, however, is termed Grand-Jean texture instead of planar-conic texture.

FIG. 2 is a first embodiment of a display device partly broken away. The display device comprises two glass supporting plates 1 and 2 between which a layer of cholesteric liquid crystal is present. The facing surfaces of the supporting plates 1 and 2 have first ridges 3 having a largest width of 300 μm which are present at a mutual pitch of 1.20 mm. A number of second ridges 4 having a largest width of 20 μm are present at a mutual pitch of 100 μm between two first ridges 3. The height of the first and second ridges 3 and 4 is 6 μm. At the given dimensions, each time nine second ridges 4 are present between two first ridges 3 but only a few are shown in the Figure for the sake of clarity.

The first and second ridges 3 and 4 are provided by coating a glass plate first with a nickel-phosphorus layer and providing thereon in known manner a mask for forming the ridges 3 and 4 by means of a photolacquer. Etching is then carried out with a solution of ammonium fluoride and hydrogen fluoride. The depth of the grooves present between the first and second ridges 3 and 4 is controlled by the duration of etching and the concentration of the etching liquid. This manner of etching results in grooves the depth of which is thoroughly homogeneous throughout the glass plate. Grooves having a depth of approximately 4–15 μm can be obtained by etching. The first and second ridges 3 and 4 may also be provided by means of silk-screen printing on a glass plate. The first and second ridges 3 and 4 may also be manufactured from a photolacquer. In that case a layer of photolacquer is provided on each of the supporting plates and is exposed via a mask. The non-exposed parts are dissolved and the remaining exposed parts form the ridges. Electrodes 5 which extend across the second ridges 4 onto the first ridges 3 are provided on the glass plates 1 and 2.

The electrodes 5 are separated from each other by a 100 μm wide strip 6 on the first ridges 3. The electrodes 5 are provided by first covering the entire glass plates 1 and 2 provided with the ridges 3 and 4 with an approximately 0.1 μm thick layer of indium oxide and/or tin oxide. After providing a mask the electrode pattern is etched by means of a solution of ferricchloride and hydrochloric acid ($FeCl_3 + HCl$). The electrodes 5 on glass plate 1, for example, constitute in this manner the rows and the electrodes 5 on the glass plate 2 constitute the columns of a matrix of picture elements. An insulating layer 7 of $SiO_2$ is sputtered on the entire surface of the glass plates 1 and 2 in a thickness of 0.5 μm. In order to obtain a homeotropic orientation of the liquid crystal 5 at the surface of the supporting plates, the insulating layer 7 is treated, for example, with a solution of perfluorosilane in hexane. Instead of providing an orienting layer on an insulating intermediate layer, it is also possible to directly provide an insulating orienting layer. The first and second ridges 3 and 4 of the supporting plates 1 and 2 contact each other at the crossings and hence ensure that the supporting plates are kept at the correct distance from each other throughout the surface of the device. The picture elements of the matrix are present at the crossings of the electrodes 5 on the supporting plates 1 and 2. Each picture element has four edges which are formed by the parts of the electrode 5 present on the ridges 3. At the area of the edges the thickness of the layer of liquid crystal is twice as small as the maximum thickness of the layer in a picture element. As a result of this the edges of a picture element are in the homeotropic-nematic texture at a field strength above $E_2$ if the picture element itself is in the homeotropic-nematic or in the focal-conic texture at a field strength between $E_1$ and $E_2$. Herewith it is prevented that the focal-conic texture with which a picture element is surrounded grows into the homeotropic-nematic texture of the picture element.

The nine ridges 4 in the example described divide each picture element into 100 sub-elements. The edges of the sub-elements are formed by the ridges 4. At the area of the ridges 4 the layer of liquid crystal is twice as thin as at the area of the central part of the sub-elements. If within a sub-element the focal-conic texture is formed as a result of an inhomogeneity in or of contamination of the surface of the electrodes, the structure cannot expand over the whole picture element. The focal-conic structure is restricted to one single sub-element by the field strength higher than $E_2$ which prevails at the edges of the sub-element.

In the embodiment shown the two ridges 4 have the same height as the first ridges 3. The second ridges 4, however, may also be lower than the first ridges 3 if only the field strength at the edges of a sub-element is higher than $E_2$.

A second embodiment will be described with reference to FIG. 3 which is a sectional view of a part of the device and in which the same components are referred to by the same reference numerals as in FIG. 2. The supporting plates 1 and 2 again comprise first ridges 3 and second ridges 4 on which electrodes 5 are provided. However, a boss 10 having a width of 40 μm and a height of 2.5 μm is present on the strip 6 between the electrodes 5 on the ridges 3. The height of the second ridges 4 is 3.5 μm. The further dimensions of the ridges are the same as in FIG. 2. An orienting layer is provided on each one of the supporting plates 1 and 2, which layer need not be electrically insulating since the supporting plates 1 and 2 engage each other with the bosses 10. At the area of the edges of the picture elements and at the area of the edges of the sub-elements the layer of liquid crystal has a smaller thickness than in the central parts of the sub-elements. These edges are in the homeotropic-nematic texture at a field strength above $E_2$ if the central parts of the sub-elements are in the homeotropic-nematic texture at a field strength between $E_1$ and $E_2$. Herewith the growing-in of the focal-conic texture from adjacent picture elements is again prevented and the formation of the focal-conic texture as a result of inhomogeneities at the surface is restricted to one single sub-element.

What is claimed is:

1. In a display device comprising two supporting plates; crossing patterns of strip-shaped electrodes on facing surfaces of said supporting plates, said crossing patterns forming a plurality of picture elements; orienting layers on said electrodes and exposed surfaces of said supporting plates; a layer of cholesteric liquid crystal between said supporting plates, wherein upon applying an electric field across said layer of liquid crystal, said liquid crystal has a focal-conic texture below a first field strength $E_1$, has a homeotropic-nematic texture above a second field strength $E_2$, and has one of said two textures for a field strength between $E_1$ and $E_2$; and first means for maintaining said liquid crystal in said homeotropic-nematic texture at edges of said picture elements above said field strength $E_2$ if said field strength between $E_1$ and $E_2$ prevails in a central part of each of said picture elements; the improvement comprising second means for dividing each picture element into a number of sub-elements, said second means further maintaining edges of each sub-element in said homeotropic-nematic texture above said field strength $E_2$ if said field strength between $E_1$ and $E_2$ prevails at the area of said picture element.

2. A display device according to claim 1, wherein said first means are formed by first ridges present on said supporting plates and separated by grooves, said first ridges having a first width, and said first ridges having a height substantially equal to half the thickness of said layer of liquid crystal, wherein said second means are formed by a number of second ridges formed in each groove, said second ridges having a second width much smaller than said first width, and wherein said electrodes are provided in said grooves and extend over said second ridges onto said first ridges, said electrodes being separated from each other by a separation distance on said first ridges.

3. A display device according to claim 2, wherein said second ridges have a height substantially equal to said height of said first grooves.

4. A display device according to claim 3, wherein a boss is present on each of said first ridges at said separation distance between said separated electrodes.

5. A display device according to claim 4, wherein said orienting layers are electrically insulating layers.

6. A display device according to claim 4, wherein an electrically insulating intermediate layer is provided between said electrodes and exposed surfaces of said supporting plates and said orienting layers.

7. A display device according to claim 4, wherein said boss has a width of 40 um and a height of 2.5 um.

8. A display device according to claim 3, wherein said orienting layers are electrically insulating layers.

9. A display device according to claim 3, wherein an electrically insulating intermediate layer is provided between said electrodes and exposed surfaces of said supporting plates and said orienting layers.

10. A display device according to claim 2, wherein a boss is present on each of said first ridges at said separation distance between said separated electrodes.

11. A display device according to claim 2, wherein said orienting layers are electrically insulating layers.

12. A display device according to claim 2, wherein an electrically insulating intermediate layer is provided between said electrodes and exposed surfaces of said supporting plates and said orienting layers.

13. A display device according to claim 2, wherein said first width is at most 300 um, and said second width is at most 20 um.

14. A display device according to claim 2, wherein said electrodes are separated by a 100 um strip on said first ridges.

15. A display device according to claim 1, wherein said orienting layers are electrically insulating layers.

16. A display device according to claim 1, wherein an electrically insulating intermediate layer is provided between said electrodes and exposed surfaces of said supporting plates and said orienting layers.

* * * * *